United States Patent [19]
Estang

[11] Patent Number: 4,512,448
[45] Date of Patent: Apr. 23, 1985

[54] SYSTEM FOR EQUILIBRATING AN IMBALANCE COUPLE AND USE OF SUCH A SYSTEM FOR EQUILIBRATING AN AIRBORNE RADAR ANTENNA

[75] Inventor: Bernard Estang, Paris, France
[73] Assignee: Thomson-CSF, Paris, France
[21] Appl. No.: 418,837
[22] Filed: Sep. 16, 1982
[30] Foreign Application Priority Data
Sep. 25, 1981 [FR] France .................. 81 18137
[51] Int. Cl.³ .......................... F16D 63/00
[52] U.S. Cl. ...................... 188/378; 343/702
[58] Field of Search .............. 343/705, 763, 764, 765, 343/709; 248/280.1, 559, 648, 364; 188/378

[56] References Cited
U.S. PATENT DOCUMENTS
2,408,825 10/1946 Varian et al. .................. 343/763
3,860,931 1/1975 Pope et al. .................... 343/765
4,396,919 8/1983 Speicher ....................... 343/766

FOREIGN PATENT DOCUMENTS
592029 9/1947 United Kingdom ............ 343/765

Primary Examiner—Eli Lieberman
Assistant Examiner—K. Ohralik
Attorney, Agent, or Firm—Cushman, Darby & Cushman

[57] ABSTRACT

An imbalance equilibrating system for an airborne radar system in which the rotation about its axis, in a clockwise or counterclockwise direction, of a pivoting element placed in cantilever relationship with respect to its axis of rotation, causes cables to wind about a pulley which is integral with and has the same axis of rotation as the pivoting element, whereby the cables transfer the rotational movement of the pivoting element to an antagonistic movement of a remotely located equilibrating mass.

8 Claims, 3 Drawing Figures

SYSTEM FOR EQUILIBRATING AN IMBALANCE COUPLE AND USE OF SUCH A SYSTEM FOR EQUILIBRATING AN AIRBORNE RADAR ANTENNA

BACKGROUND OF THE INVENTION

The present invention relates to a system for equilibrating an imbalance couple, the use thereof for equilibrating an airborne radar antenna and an antenna equilibrated by such a system.

Some mechanisms driven with a rotational movement are sometimes subjected to variable accelerations. When they are placed in cantilever relation with respect to the rotational axis, the imbalance thus created must be equilibrated.

This is in particular the case with an airborne radar antenna which is orientatable along three orthogonal axes. The axis carrying the antenna must house elements such as motors, angle recopying elements or rotary joints. The antenna is then placed in complete cantilever relation with this axis. The cantilever is often very great and may reach fifteen centimeters for large antennae.

During a banking turn or when pulling out from a dive, the carrier plane may impose on the antenna load factors reaching 10 g. The mass of the antenna and consequently the imbalance couple, when it is not equilibrated, are multiplied by this factor. The imbalance may then exceed the maximum possible drive torque.

In the prior art, a part rotating about an axis is balanced by means of masses carried by the securing device of the mobile part opposite said part with respect to the axis of rotation considered. The balancing masses may be troublesome, either because of their very mass which is added to the mass of the rotating mechanism or because of their volume which limits the amplitude of the rotational movement.

SUMMARY OF THE INVENTION

An object of the present invention is a system for remotely equilibrating a part driven with a rotational movement about an axis with respect to which it is in cantilever relation for remedying the above-mentioned disadvantages.

The equilibrating system provided by the present invention is independent of the direction and of the value of the acceleration which may be applied to the rotating member in the rotational plane.

Another object of the present invention is an imbalance equilibrating system for lightening the weight of portions of the mechanism disposed in cantilever relationship.

Another object of the present invention is an equilibrating system for improving the vibrational behaviour and raising the resonance frequency of the structures supporting the rotating part.

Another object of the present invention is an equilibrating system in which the equilibrating masses are transferred to non mobile zones.

The present invention has as an object an equilibrating system in which the amplitude of the rotational movement is made greater by reducing the volume of any equilibrating masses which may have to be carried by the securing device opposite the mobile part, (reducing the shaded area of FIG. 1).

The present invention has as an object a system for equilibrating an imbalance couple for an element disposed in cantilever relation with the rotational axis about which it pivots in one direction or another, wherein the imbalance couple is reproduced remotely and antagonistically by an equilibrating mass to which it is communicated by transmission means.

BRIEF DESCRIPTION OF THE DRAWINGS

The present invention will be better understood from the detailed description given hereinafter with reference to the accompanying drawings which show.

DESCRIPTION OF THE PREFERRED EMBODIMENTS

Figure 1:
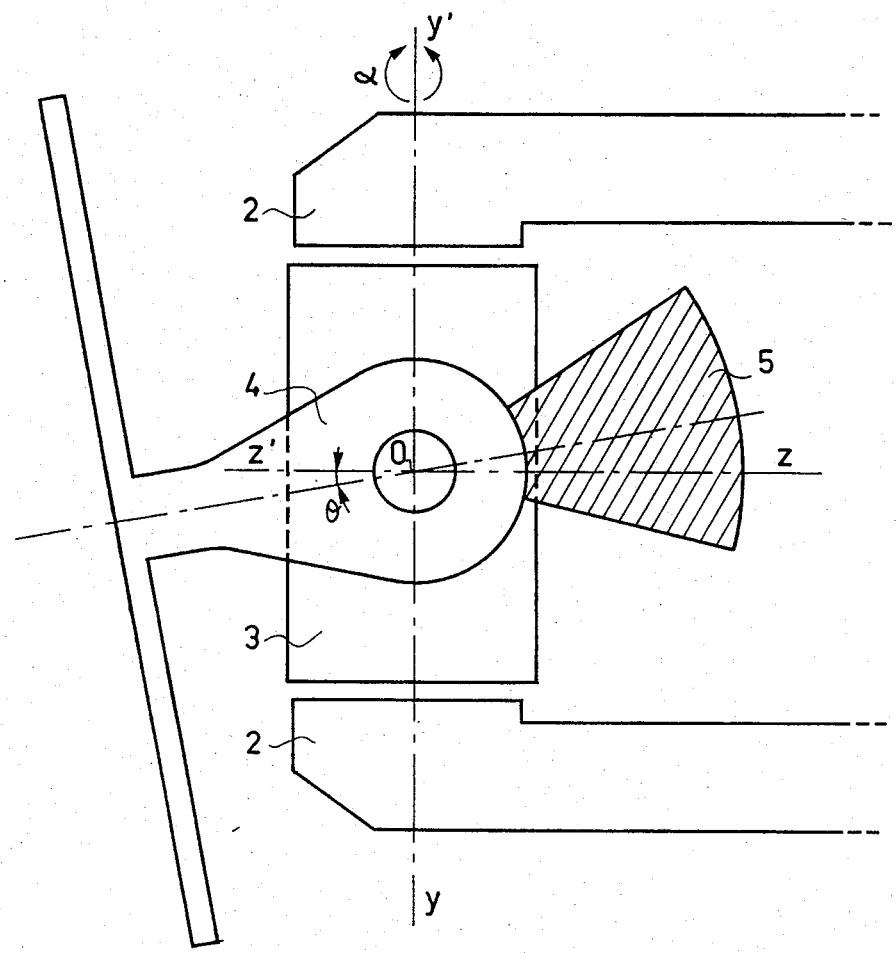
FIG. 1 a side sectional view of an imbalance equilibrating system of the prior art, applied to an antenna mechanism.

The accompanying figures show the particular application to airborne radar antennae of the imbalance equilibrating systems of the prior art and in accordance with the present invention. But this particular embodiment does not form a limiting example of the present invention.

In the different figures, the same reference designate identical parts or parts playing the same role. Thus, reference 1 designates the antenna mounted between the two arms 2 of the antenna support (shown partially) for pivoting about three orthogonal axes by means of two parts 3 and 4 which are mobile with respect to one another. The securing part 4 is integral with antenna 1. Since the antenna assembly 1, 2, 3, 4 and the orientation mechanism itself do not form part of the invention they will not be described in detail.

Figure 2:
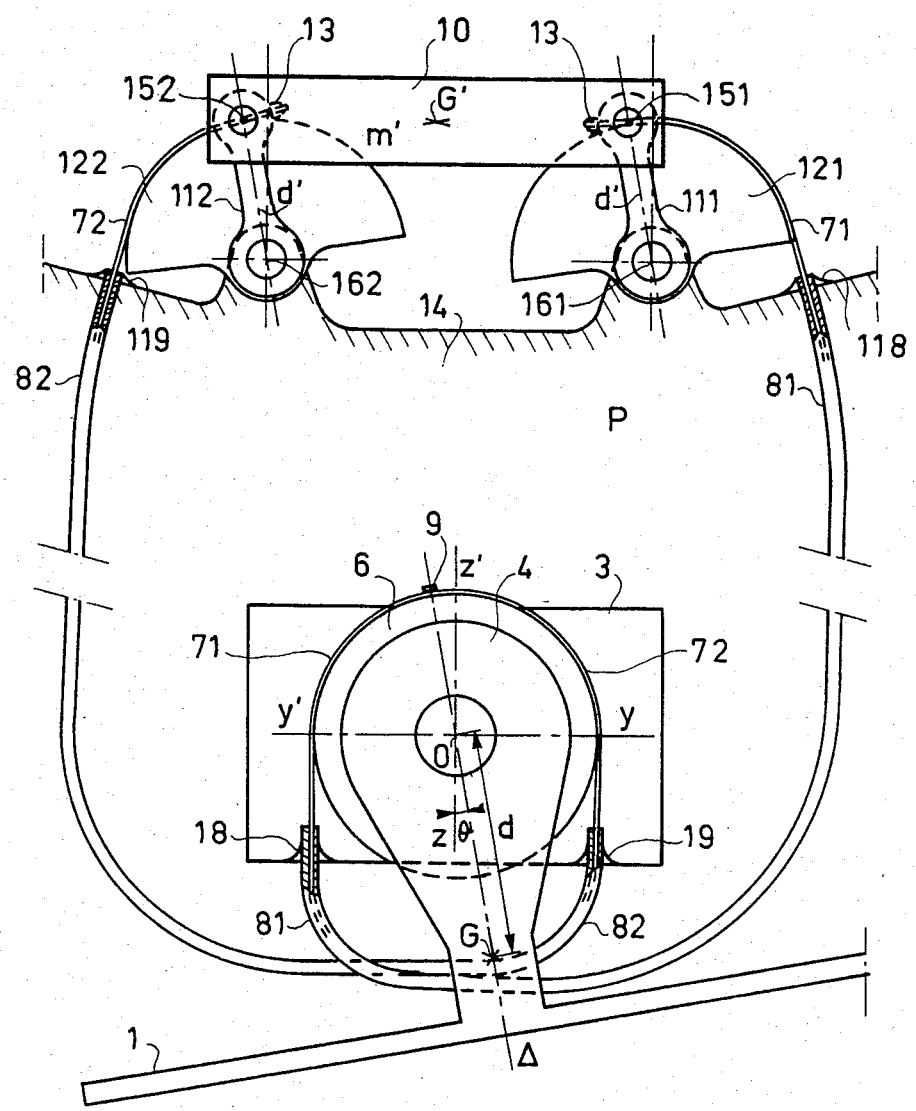
FIG. 2, the side sectional view of a preferred embodiment of the imbalance equilibrating system of the invention, applied to an antenna mechanism.
Figure 3:
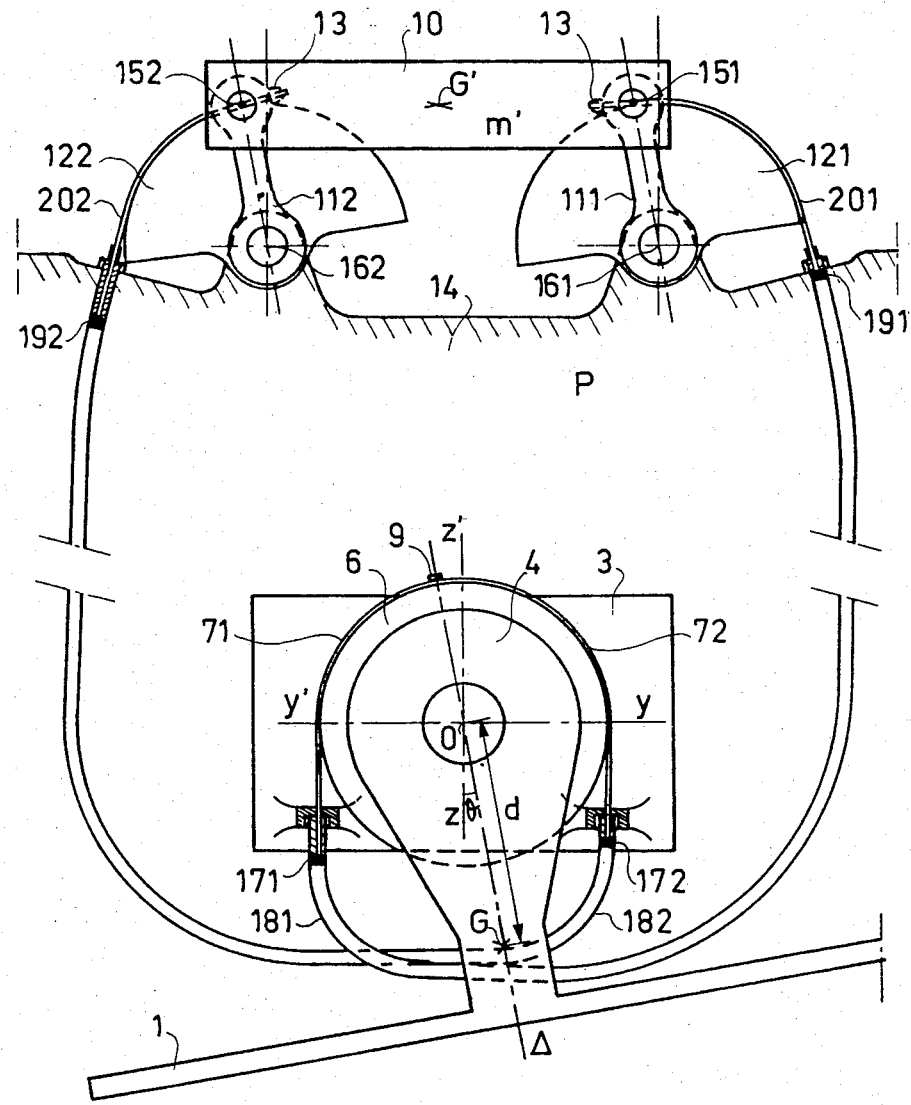
FIG. 3, the side sectional view of a preferred embodiment of the system shown in FIG 2.

The accompanying FIGS. 1, 2, 3 are side views in section along a vertical plane P passing through the center of rotation O. The three rotational axes are designated by x'Ox, the transverse horizontal axis shown solely by its trace O in plane P, y'Oy, the vertical axis and z'Oz, the longitudinal horizontal axis.

The antenna 1 pivots about the first axis x'Ox with an angle $\pm \theta$ with respect to the plane (x'Ox, z'Oz), about the second axis y'Oy with an angle $\pm \alpha$ with respect to the plane (x'Ox, y'Oy) and about the third axis of rotation z'Oz with an angle $\pm \beta$ with respect to the plane (y'Oy, z'Oz).

FIG. 1 shows a side view of an equilibrating system of the prior art.

The antenna imbalance is equilibrated by means of a mass 5 fixed to the securing piece 4 on the other side of the antenna with respect to the center of rotation O. The mass acts directly on the axis of rotation x'Ox and its volume limits the free movement of the antenna in the $\theta$ and $\alpha$ directions.

FIG. 2 shows the vertical section of the preferred embodiment of the equilibrating system of the present invention. The securing piece 4 is integral with a vertical pulley 6 and has the same axis of rotation x'Ox as pulley 6. The assembly formed by antenna 1 and pulley 6 has a symmetrical plane ($\Delta$, x'Ox) orthogonal to the vertical sectional plane P and shown by its trace $\Delta$.

Two cables 71 and 72, sliding in sleeves 81 and 82 respectively, are fixed by means 9 at a point on the circumference of the pulley situated on the axis of symmetry Δ and on the other side of the center of rotation O with respect to antenna 1.

Sleeves 81 and 82 are fixed to the antenna support structure 3 by means 18 and 19 respectively.

The equilibrating system in accordance with the present invention also comprises, inside the structural case of the antenna mechanism, an equilibrating mass fixed by means of two links 111 and 112 to the structural case 14. The two links 111 and 112 are attached to the mass 10 at securing points 151 and 152, respectively. The two links 111 and 112 are also attached to the structural case 14 at securing points 161 and 162 respectively. Links 111 and 112 are integrally formed with vertical half-pullies 121 and 122 respectively. Securing point 151 is fixed to the periphery of the pulley 121 and securing point 152 is fixed to the periphery of the pulley 122. Securing point 161 is coincident with the center of rotation of pulley 121 while securing point 162 is coincident with the center of rotation of pulley 122.

Sleeves 81 and 82 are fixed to the fixed structure 14 by means 118 and 119 respectively.

Cables 71 and 72, carried inside sleeves 81 and 82, respectively, under the securing piece 4 of antenna 1 with respect to the sectional plane P of FIG. 2. The cables pass through the securing points 151 and 152 respectively at the head of the links 111 and 112 respectively and are fixed by means 13.

If we assume that the air craft is flying normally, cable 71 is disposed about the upper part of pulley 6 and cable 72 about the lower part of pulley 6. After the cables cross each other, cable 71 is located below cable 72 in the vertical section of plane P. Since the structure is symmetrical, the roles of cables 71 and 72 are reversed when the aircraft flies upside down.

The system operates in the following way:

In the case of level flight of the aircraft, if the plane of symmetry (Δ, x'Ox) of the antenna assembly takes on an inclination $-\theta$ (downwards with respect to the horizontal plane x'Ox, z'Oz), pulley 6 also rotates through an angle $\theta$ in a counter clockwise direction. Cable 72, fixed to the pulley 6 by means 9, winds around the pulley over a length equal to the arc $\theta$, while sliding inside sleeve 82, whereas cable 71 is released over an identical length. Cable 72, which is the upper cable pulls the head of link 152 and consequently moves mass 10 upwards. Cable 71 accompanies and limits the movement since its securing point at 9 has moved by a corresponding length. Conversely, if the antenna is orientated so that the plane of symmetry (Δ, x'Ox) forms an angle $+\theta$ (upwards with respect to the horizontal plane x'Ox, z'Oz), the pulley 6 rotates through an angle $\theta$ in a clockwise direction. Cable 71, fixed to the pulley 6 by means 9, winds around the pulley over a length equal to the arc $\theta$ while sliding inside sleeve 81, whereas cable 72 is slackened off over an identical length. Cable 71, which is the lower cable, draws the head of link 151 and consequently moves mass 10 downwards. Cable 72 accompanies the movement and limits it since its securing point 9 has moved by a length equal to that of the securing point 9 of cable 71. It also helps to support mass 10.

The roles of cables 71 and 72 are reversed when the aircraft is flying upside down.

The equilibrating mass thus experiences a linear movement which is proportional to the rotational movement of the antenna.

When the antenna moves about its axis, the imbalance couple is of the form:

$$C = m\gamma d \cos \theta$$

where
m is the mass of the antenna,
d the distance from its center of gravity G to the axis of rotation,
$\gamma$ the acceleration in the locality considered,
$\theta$ the angle of free movement.

Thus, the same movement has been recreated at the level of the equilibrating mass by creating an antagonistic couple of the form:

$$C' = m'\gamma d' \cos \theta$$

where
m' is the equilibrating mass (mass 10),
d' the distance from the center of gravity G' of the mass to its axis of rotation, so the distance between securing points 151 and 161 or securing points 152 and 162.

Cables 71 and 72, sliding in sleeves 81 and 82 respectively, balance the antenna through an antagonistic couple C' equal to the imbalance couple C.

The equilibrating system is independent of the direction of acceleration in the plane (y'Oy, z'Oz), as in the case of flying upside down. The equilibrating system is also independent of the value of the acceleration, since the acceleration acts both on the antenna and on the equilibrating masses and does not affect the equality of the imbalance C and antagonistic C' couples.

FIG. 3 shows a variation of the preferred embodiment of FIG. 2. The operating principle remains the same but the cables sliding inside sleeves are replaced by a fluid connection, which eliminates the friction of cables 71 and 72 in their respective sleeve 81 and 82. The same references have been used for FIG. 3 as for FIG. 2 except in so far as the transmission means 71, 72 and 81, 82 are concerned. The transmission means used are hydraulic cylinder and piston devices. When antenna 1, and pulley 6 which is interlocked therewith, rotates through an angle $\theta$, the securing means 9 for cables 71 and 72 move at the periphery of pulley 6 over an arc length corresponding to angle $\theta$, $-\theta$ in the clockwise direction or $-\theta$ in the counter clockwise direction according to the direction of rotation of the plane of symmetry (Δ, x'Ox) with respect to the plane (x'Ox, z'Oz). Cables 71 and 72 act on pistons 171 and 172. The pressure differences are transmitted, through identical fluid passageways 181 and 182 after crossing thereof at the level of the securing piece 4, to pistons 191 and 192. In the case of a rotation through $-\theta$, cable 71 draws piston 171, which cause piston 191 to penetrate into passageway 181 for a corresponding length, and causes piston 172 to penetrate into its passageway, which pushes piston 192 out of passageway 182 for an identical length. Mass 10 is then moved antagonistically by means of links 111 and 112 on the head (designated by its center 151, respectively 152) of which the fluid pressure transmitted by passageways 181 and 182 and pistons 191 and 192 act through cables 201 and 202 fixed to pistons 191, 192 respectively, and to the heads, with centers 151 and 152, of the links by means 13.

When the rotation is through an angle $-\theta$, the role of cables 71 and 72 as well pistons 171 and 172 is reversed.

The movements of mass 10 and antenna 1 will be antagonistic as explained in the description corresponding to FIG. 2 and to the above explanation of the operating mode of the remote transmission means of the imbalance couple.

The embodiments of FIGS. 2 and 3 are not limiting. Any embodiment which remotely and antagonistically reproduces the imbalance couple of a mechanism placed in cantilever relation and driven with a rotational motion about an axis does not depart from the scope of this invention.

What is claimed is:

1. An apparatus for remotely equilibrating an imbalance couple comprising:
   pivoting means mounted in cantilever relation to its axis of rotation for rotational movement;
   a pulley attached to said pivoting means and having a rotational axis coincident with the rotational axis of said pivoting means;
   an equilibrating mass mounted detached from said pivoting means and remote therefrom; and
   transmission means coupling said pulley to said equilibrating mass whereby the rotational movement of said pivoting means is transferred to a proportional and antagonistic movement of said equilibrating mass.

2. An apparatus for remotely equilibrating an imbalance couple according to claim 1 wherein said transmission means includes first transmission, and second transmission means for causing the movement of said equilibrating mass in the same rotational direction but in opposite linear direction from the movement of said pivoting means.

3. An apparatus for remotely equilibrating an imbalance couple according to claim 2 further comprising a structural case member, and wherein said first transmission and second transmission means each include:
   a link having two heads, the first head attached to said equilibrating mass, the second head attached to said structural case member; and
   a cable having two ends, the first end attached to said pulley and around which said cable winds and unwinds as the pivoting means pivots about its axis of rotation, and the second end acts upon said first head of said link such that said cable pushes or pulls said first head of said link thus causing said link to rotate about an axis passing through said second head of said link, thereby causing a movement of said equilibrating mass in an antagonistic direction from said pivoting means.

4. An apparatus for remotely equilibrating an imbalance couple according to claim 3 wherein said first transmission and second transmission means each further comprise a sleeve within which said cable is routed and which supports and guides said cable during its movement.

5. An apparatus for remotely equilibrating an imbalance couple according to claim 3 wherein said second end of said cable is directly connected to said first head of said link.

6. An apparatus for remotely equilibrating an imbalance couple according to claim 2 wherein said first transmission and second transmission means each further comprise:
   a fluid-filled passageway having a first end and a second end;
   a first piston movably positioned within said first end of said fluid-filled passageway;
   a second piston movably positioned within said second end of said fluid-filled passageway;
   a first cable having two ends, one end attached to said pulley, and the other end attached to said first piston;
   a second cable having two ends, one end attached to said second piston, and the other end attached to said equilibrating mass such that the rotation of said pulley causes said first cable to move causing said first piston to act upon said fluid-filled passageway causing said second piston to move and act upon said second cable which causes a proportional and antagonistic movement of said equilibrating mass.

7. An apparatus for remotely equilibrating an imbalance couple according to claim 1 wherein said pivoting means includes an airborne radar antenna.

8. An apparatus for remotely equilibrating an imbalance couple according to claim 6 wherein said pivoting means includes an airborne radar antenna.

* * * * *